June 24, 1952  G. H. COOK  2,601,367
FOUR-COMPONENT OPTICAL OBJECTIVES
Filed April 24, 1950
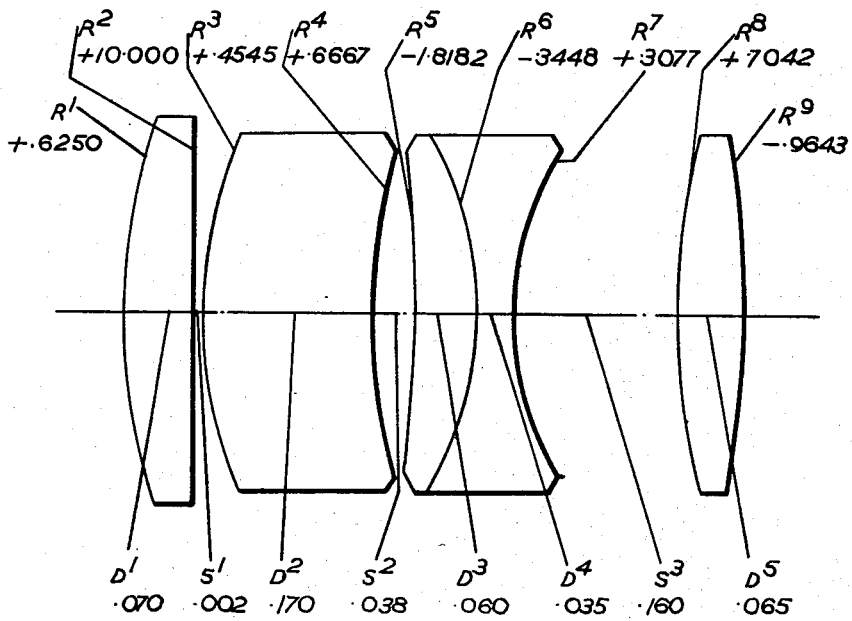
Inventor
GORDON H. COOK
By Emery Holcombe & Blair
Attorneys Patented June 24, 1952

2,601,367

UNITED STATES PATENT OFFICE 2,601,367

FOUR-COMPONENT OPTICAL OBJECTIVES

Gordon Henry Cook, Leicester, England, assignor to Taylor, Taylor & Hobson Limited, Leicester, England, a company of Great Britain Application April 24, 1950, Serial No. 157,663
In Great Britain May 26, 1949

16 Claims. (Cl. 88—57)

This invention relates to an optical objective for photographic or other purposes, corrected for spherical and chromatic aberrations, coma, astigmatism and field curvature, and consisting of four components of which the front two and the rear component are convergent and the third component is divergent. It is to be understood that the terms "front" and "rear" are used herein in accordance with the usual convention to indicate the sides of the objective respectively nearer to and further from the longer conjugate.

The invention has for its object to provide an objective of this kind having a very high degree of correction for zonal spherical aberration and for coma and generally giving improved corrections for all the abberations over a reduced angular field, thereby permitting the objective to have greater relative aperture and longer focal length than hitherto.

In the objective according to the present invention the three convergent components are all simple, whilst the divergent component consists of a doublet having a collective cemented contact surface concave to the front with radius of curvature between .3 and .4 times the equivalent focal length of the objective, the mean refractive index of the material of the front element of such component exceeding that of the rear element thereof by between .04 and .10.

Preferably the focal lengths of the four components counting from the front respectively lie between .75 and 1.5, 1.5 and 2.5, .33 and .5, and .5 and 1.0 times the equivalent focal length of the objective, whilst the focal length of the group consisting of the front three components, whether convergent or divergent, is greater than five times such equivalent focal length.

The second component is preferably of strongly meniscus form with its surfaces convex to the front, the radius of curvature of the rear surface thereof being between .4 and 1.0 times the equivalent focal length of the objective.

The front surface of the compound divergent third component is preferably concave to the front with radius of curvature greater than the equivalent focal length of the objective.

The material of which the convergent rear component is made preferably has a mean refractive index greater than and an Abbé V number less than those of the convergent front two components, and the front surface of the rear component is preferably convex to the front with radius of curvature between .5 and 1.0 times the equivalent focal length of the objective and also less than that of the rear surface of such component.

The overall length of the objective from the front surface of the front component to the rear surface of the rear component preferably lies between .5 and .7 times the equivalent focal length of the objective, the axial thicknesses of the convergent first and second components being respectively between .05 and .1 and between .1 and .25 times such equivalent focal length.

A preferred construction of objective according to the invention is illustrated in the accompanying drawing, and numerical data therefor are given in the accompanying table, in which $R_1 R_1 R_2 \ldots$ represent the radii of curvature of the individual surfaces counting from the front, the positive sign indicating that the surface is convex to the front and the negative sign that it is concave thereto, $D_1 D_2 \ldots$ represent the axial thicknesses of the various elements of the objective, and $S_1 S_2 S_3$ represent the axial air separations between the components. The table also gives the mean refractive indices $n_D$ for the D-line and the Abbé V numbers of the materials used for the various elements.

| Equivalent focal length 1.000. Relative Aperture F/2.6 | | | |
|---|---|---|---|
| Radius | Thickness or Air Separation | Refractive Index $n_D$ | Abbé V Number |
| $R_1 = +\ .6250$ | $D_1 = .070$ | 1.5882 | 61.4 |
| $R_2 = +10.000$ | $S_1 = .002$ | | |
| $R_3 = +\ .4545$ | $D_2 = .170$ | 1.5882 | 61.4 |
| $R_4 = +\ .6667$ | $S_2 = .038$ | | |
| $R_5 = -\ 1.8182$ | $D_3 = .060$ | 1.7181 | 48.1 |
| $R_6 = -\ .3448$ | $D_4 = .035$ | 1.6502 | 33.8 |
| $R_7 = +\ .3077$ | $S_3 = .160$ | | |
| $R_8 = +\ .7042$ | $D_5 = .065$ | 1.6544 | 46.2 |
| $R_9 = -\ .9643$ | | | |

It will be noticed that in this example the mean refractive index of the material of the front element of the divergent compound third component exceeds that of the rear element thereof by .0679.

The overall length of the objective between the surfaces $R_1$ and $R_9$ is .600 times the equivalent focal length of the objective.

The focal length of the front component is 1.13 times the equivalent focal length of the objective and the corresponding figures for the second, third and fourth components are 1.87, .43 and .63. The focal length of the group comprising the front three components is 15.55 times the equivalent focal length of the objective, this group having weak convergent power.

The insertion of equals (=) signs in the radius column of the table, in company with plus (+) and minus (−) signs which indicate whether the surface is convex or concave to the front, is for conformity with the Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

What I claim as my invention and desire to secure by Letters Patent is:

1. An optical objective corrected for spherical and chromatic aberrations, coma, astigmatism and field curvature and comprising a simple convergent front component, a simple convergent second component, a third component which consists of a divergent doublet having a collective cemented contact surface concave to the front with radius of curvature between .3 and .4 times the equivalent focal length of the objective, the mean refractive index of the material of the front element of the third component exceeding that of the rear element thereof by between .04 and .10 and a simple convergent rear component made of material having Abbé V number between 40 and 55 and mean refractive index exceeding the arithmetic mean of the mean refractive indices of the materials of the front two components by at least .03, the axial thickness of the front component being less than ⅔ of that of the second component whilst the axial thickness of the doublet third component is less than ⅘ of that of the second component, the axial distance from the front surface of the front component to the rear surface of the doublet third component lying between one-half and three-quarters of the equivalent focal length of the objective.

2. An optical objective as claimed in claim 1, in which the front surface of the divergent third component is concave to the front and has a radius of curvature greater than the equivalent focal length of the objective.

3. An optical objective as claimed in claim 1, in which the front surface of the rear component is convex to the front with radius of curvature between .5 and 1.0 times the equivalent focal length of the objective and also less than that of the rear surface of such component, the material of such component having mean refractive index greater than and Abbé V number less than those of the front two components.

4. An optical objective as claimed in claim 1, in which the overall length of the objective from the front surface of the front component to the rear surface of the rear component lies between .5 and .7 times the equivalent focal length of the objective, the axial thicknesses of the first and second components being respectively between .05 and .1 and between .1 and .25 times such equivalent focal length.

5. An optical objective corrected for spherical and chromatic aberrations, coma, astigmatism and field curvature and comprising a simple convergent front component, a simple convergent second component, a third component which consists of a divergent doublet having a collective cemented contact surface concave to the front with radius of curvature between .3 and .4 times the equivalent focal length of the objective, the mean refractive index of the material of the front element of the third component exceeding that of the rear element thereof by between .04 and .10, and a simple convergent rear component made of material having Abbé V number between 40 and 55 and mean refractive index exceeding the arithmetic mean of the mean refractive indices of the materials of the front two components by at least .03, the axial thickness of the front component being less than ⅔ of that of the second component whilst the axial thickness of the doublet third component is less than ⅘ of that of the second component, the focal lengths of the four components counting from the front respectively lying between .75 and 1.5, 1.5 and 2.5, .33 and .5 and .5 and 1.0 times the equivalent focal length of the objective, whilst the focal length of the group consisting of the front three components, is numerically greater than 5 times such equivalent focal length.

6. An optical objective as claimed in claim 5, in which the front surface of the divergent third component is concave to the front and has a radius of curvature greater than the equivalent focal length of the objective.

7. An optical objective as claimed in claim 5, in which the front surface of the rear component is convex to the front with radius of curvature between .5 and 1.0 times the equivalent focal length of the objective and also less than that of the rear surface of such component, the material of such component having mean refractive index greater than and Abbé V number less than those of the front two components.

8. An optical objective as claimed in claim 5, in which the overall length of the objective from the front surface of the front component to the rear surface of the rear component lies between .5 and .7 times the equivalent focal length of the objective the axial thicknesses of the first and second components being respectively between .05 and .1 and between .1 and .25 times such equivalent focal length.

9. An optical objective corrected for spherical and chromatic aberrations, coma, astigmatism and field curvature and comprising a simple convergent front component, a simple convergent second component which is of meniscus form with its surfaces convex to the front, the radius of curvature of the rear surface thereof being between .4 and 1.0 times the equivalent focal length of the objective, a third component which consists of a divergent doublet having a collective cemented contact surface concave to the front with radius of curvature between .3 and .4 times the equivalent focal length of the objective, the mean refractive index of the material of the front element of the third component exceeding that of the rear element thereof by between .04 and .10 and a simple convergent rear component made of material having Abbé V number between 40 and 55 and mean refractive index exceeding the arithmetic mean of the mean refractive indices of the materials of the front two components by at least .03, the axial thickness of the front component being less than ⅔ of that of the second component whilst the axial thickness of the doublet third component is less than ⅕ of that of the second component.

10. An optical objective as claimed in claim 9, in which the front surface of the divergent third component is concave to the front and has a radius of curvature greater than the equivalent focal length of the objective.

11. An optical objective as claimed in claim 9, in which the front surface of the rear component is convex to the front with radius of curvature between .5 and 1.0 times the equivalent focal length of the objective and also less than that of the rear surface of such component, the material of such component having mean refractive index greater than and Abbé V number less than those of the front two components.

12. An optical objective as claimed in claim 9, in which the overall length of the objective from the front surface of the front component to the rear surface of the rear component lies between .5 and .7 times the equivalent focal length of the objective the axial thicknesses of the first and second components being respectively between .05 and .1 and between .1 and .25 times such equivalent focal length.

13. An optical objective corrected for spherical and chromatic aberrations, coma, astigmatism and field curvature and comprising a simple convergent front component, a simple convergent second component which is of meniscus form with its surfaces convex to the front, the radius of curvature of the rear surface thereof being between .4 and 1.0 times the equivalent focal length of the objective, a third component which consists of a divergent doublet having a collective cemented contact surface concave to the front with radius of curvature between .3 and .4 times the equivalent focal length of the objective, the mean refractive index of the material of the front element of the third component exceeding that of the rear element thereof by between .04 and .10, and a simple convergent rear component made of material having Abbé V number between 40 and 55 and mean refractive index exceeding the arithmetic mean of the mean refractive indices of the materials of the front two components by at least .03, the axial thickness of the front component being less than ⅔ of that of the second component whilst the axial thickness of the doublet third component is less than ⅕ of that of the second component, the focal lengths of the four components counting from the front respectively lying between .75 and 1.5, 1.5 and 2.5, .33 and .5 and .5 and 1.0 times the equivalent focal length of the objective, whilst the focal length of the group consisting of the front three components, is numerically greater than 5 times such equivalent focal length.

14. An optical objective as claimed in claim 13, in which the front surface of the divergent third component is concave to the front and has a radius of curvature greater than the equivalent focal length of the objective.

15. An optical objective as claimed in claim 14, in which the front surface of the rear component is convex to the front with radius of curvature between .5 and 1.0 times the equivalent focal length of the objective and also less than that of the rear surface of such component, the material of such component having mean refractive index greater than and Abbé V number less than those of the front two components.

16. An optical objective as claimed in claim 15, in which the overall length of the objective from the front surface of the front component to the rear surface of the rear component lies between .5 and .7 times the equivalent focal length of the objective, the axial thicknesses of the first and second components being respectively between .05 and .1 and between .1 and .25 times such equivalent focal length.

GORDON HENRY COOK.

REFERENCES CITED

The following references are of record in the file of this patent:

UNITED STATES PATENTS

| Number | Name | Date |
|---|---|---|
| 1,584,272 | Bertele | May 11, 1926 |
| 1,877,355 | Minnor | Sept. 13, 1932 |
| 1,899,934 | Berek | Mar. 7, 1933 |

FOREIGN PATENTS

| Number | Country | Date |
|---|---|---|
| 595,422 | Great Britain | Dec. 4, 1947 |